United States Patent [19]

Sollinger

[11] Patent Number: 4,907,528
[45] Date of Patent: Mar. 13, 1990

[54] DEFLECTION COMPENSATING DEVICE FOR A SMOOTHING DEVICE FOR A COATING APPLYING UNIT

[75] Inventor: Hans-Peter Sollinger, Heidenheim, Fed. Rep. of Germany

[73] Assignee: J. M. Voith GmbH, Fed. Rep. of Germany

[21] Appl. No.: 203,436

[22] Filed: Jun. 7, 1988

[30] Foreign Application Priority Data

Jun. 10, 1987 [DE] Fed. Rep. of Germany ....... 3719276

[51] Int. Cl.$^4$ .............................................. B05C 11/04
[52] U.S. Cl. ..................................... 118/121; 118/126
[58] Field of Search ............... 72/243; 29/113.1, 113.2; 118/121, 122, 123, 126, 400, 413

[56] References Cited

U.S. PATENT DOCUMENTS

| 2,062,421 | 12/1936 | Lindbom | 29/113.1 |
| 2,801,694 | 8/1957 | Schneider et al. | 29/113.1 |
| 2,876,961 | 3/1959 | Cole et al. | 29/113.1 |
| 2,987,994 | 6/1961 | Allison | 29/113.1 |
| 3,098,284 | 7/1963 | Hornbostel | 29/113.1 |
| 3,399,420 | 9/1968 | Crist | 29/113.1 |
| 3,543,366 | 12/1970 | Collet | 29/113.1 |
| 3,586,602 | 6/1971 | Schmidt | 29/113.1 |
| 3,706,119 | 12/1972 | Collet | 29/113.1 |
| 3,802,044 | 4/1974 | Spillman et al. | 29/113.2 |
| 4,007,522 | 2/1977 | Hold et al. | 29/113.1 |
| 4,481,799 | 11/1984 | Glattfelder et al. | 29/113.2 |
| 4,625,637 | 12/1986 | Pav et al. | 72/243 |
| 4,712,472 | 12/1987 | Meisen et al. | 29/113.1 |
| 4,757,584 | 7/1988 | Pav et al. | 29/113.2 |

FOREIGN PATENT DOCUMENTS 279107 8/1913 Fed. Rep. of Germany ..... 29/113.1
1202167 6/1968 United Kingdom .

*Primary Examiner*—Willard Hoag
*Attorney, Agent, or Firm*—Ostrolenk, Faber, Gerb & Soffen

[57] ABSTRACT

The smoothing device has a support beam. The beam is compensated along its line of flexure by a support member arranged centrally in it and which corrects the flexure of the support beam, which is due to the effect of gravity thereon or to a lesser extent due to any counter acting force of the doctor supported on the beam. A tube surrounds and is spaced radially out from the support member. A plurality of hydraulically or pneumatically actuated pressing elements are disposed between the tube and inside of the beam and extend over the length of the beam and are pressurized to support the beam.

20 Claims, 3 Drawing Sheets

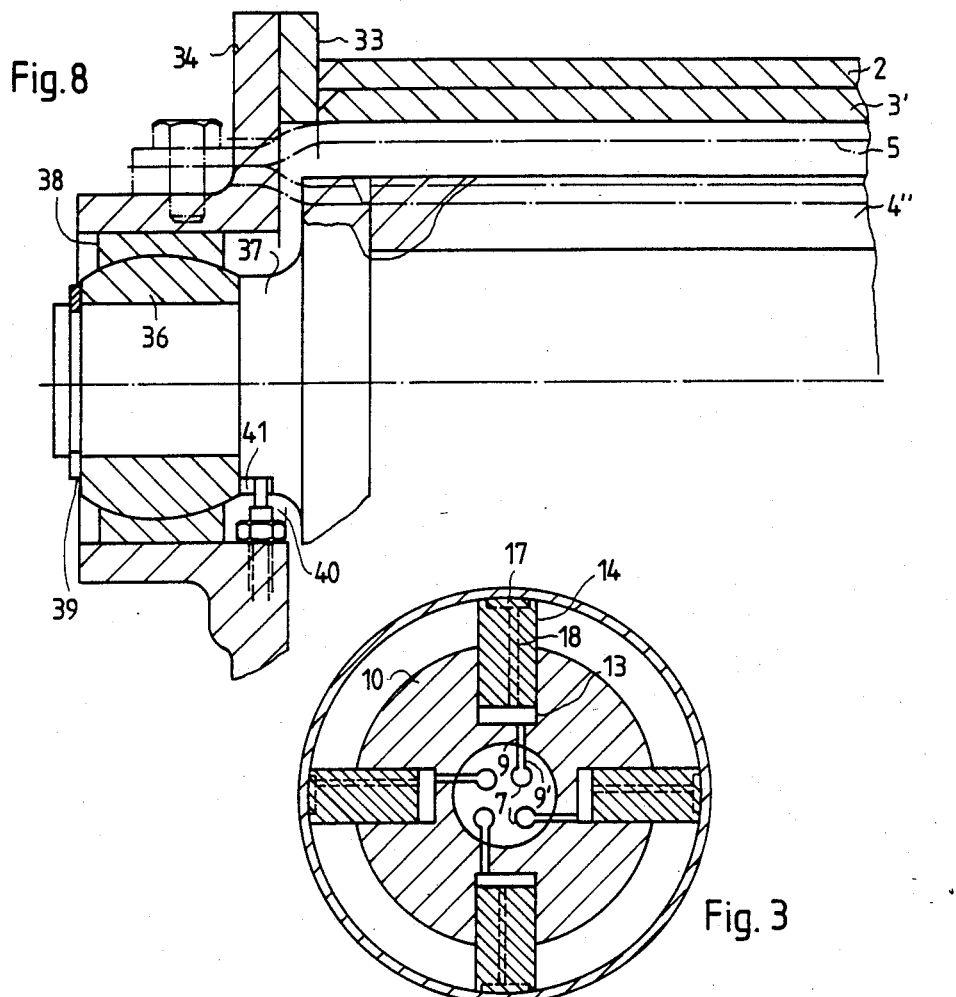
Fig. 8
Fig. 3
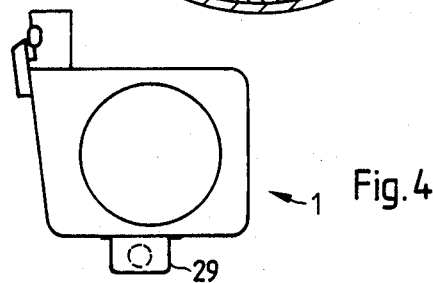
Fig. 4
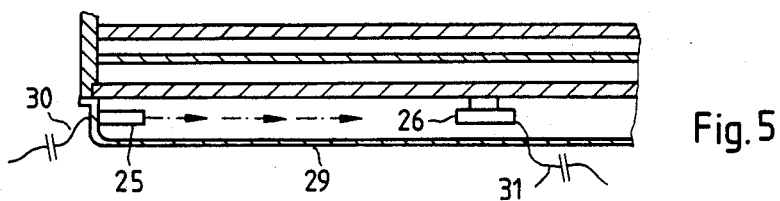
Fig. 5

DEFLECTION COMPENSATING DEVICE FOR A SMOOTHING DEVICE FOR A COATING APPLYING UNIT

BACKGROUND OF THE INVENTION

The invention relates to a smoothing device of a coating applying unit for coating a moving web. More particularly, the invention relates to deflection compensation apparatus for the support beam of the smoothing device for a web coating unit. The smoothing device supports a doctor element and includes means which maintain the doctor element at the desired pressure against the web or against a counter roller arranged counter to the doctor element and on which the web moves. The beam is likely to sag under the combined effects of gravity and to a lesser extent to counter the effect of the pressure on the doctor supported on the beam.

The smoothing device comprises a support beam which supports the doctor element via a holding means on the support beam. A central support member extends through the typically hollow support beam. At least two rows of hydraulically or pneumatically actuated, i.e. pressure fluid or pressure medium actuated, pressing elements extend longitudinally along the smoothing device and are disposed between the central support member and the support beam. The invention concerns the manner in which the pressing elements are connected with and act upon the support beam.

Such a device has been proposed in British Patent No. 1,202,167. There the support beam is hollow in order to increase the rigidity of the support beam in relation to its weight.

SUMMARY OF THE INVENTION

One object of the invention is to provide an advantageous design of such a support beam in which it is possible to ensure an adjustable direction of the flexion correction forces so that a spreading blade or doctor blade is pressed into engagement evenly in accordance with requirements, also taking flexion of the support beam into account.

In order to achieve this object, in a smoothing device according to the invention, an outer support element in the form of an external tube extends around the central support member and is radially spaced from it and that outer support element or tube, in turn, directly supports the support beam. The external tube has a cross section that is generally circular. At least two rows of hydraulically or pneumatically actuated pressing elements are disposed radially inwardly of the external tube and radially outwardly of the support member for providing the support, and the rows of pressing elements extend along the axial length of the beam. Preferably there are four rows of the hydraulic pressing elements, although two rows generally opposed to the web or opposite roll, or even one row, might perform the necessary supporting function, but not as well as the larger number of rows of pressing elements.

The central support member is a radially symmetric structure. The support member may be in the form of a hollow cylinder or an inner tube, for example. In one suggested version, the support member has an exterior shape which decreases or tapers narrower in cross-section from its widest axial center towards its narrowest axial ends, generally in accordance with an e-function, so that it has a crowned form.

Each hydraulic pressing element may comprise a respective pressure hose. The hoses press in against the support member, on the one hand, and out against the external tube, on the other hand.

Each hydraulic pressing element may alternatively comprise a respective parallel row of pressing pistons which are carried by the support member and press outwardly upon the external tube. The piston array conforms to the cross section of the supported support beam. The pistons have external radii. They are in a substantially symmetrical arrangement. They are preferably pressurized in pairs of opposite pistons. The pressing pistons are shaped at their radially outer ends to define sealing pressurized pockets which press against the inside of the external tube.

Because of expected axial shifting between the support beam outside and the support member inside it, the support beam bears upon the external tube, at least in the axial direction, in a freely sliding manner. For this purpose, intervening support walls are disposed between the support beam and the external tube, and these walls would typically be fastened to only one or the other of those two elements. The support walls between the support tube and the support beam are preferably placed in positions corresponding to the rows of pressing elements so as to transmit the thrust of the hydraulic pressing elements to the support beam.

All of the various supporting elements, including the tube, the support member and the pressing elements, are carried in antifriction bearings for being supported in relation to the support beam. In particular, the support member may be supported at its end by part spherical bearings through an annular member located on the support beam.

Where space is limited and where the cross-section of the support beam, which resists flexion, has to be made very small, the design according to the invention makes possible compensation for the flexion of the support beam. Using control means, it is possible to ensure that the engaging doctor edge is quite straight or that the engaging edge has such a form that there is an even pressing effect of the doctor element on the web of material.

Other objects and features of the invention are described with reference to the embodiments shown in the drawings.

DESCRIPTION OF THE DRAWINGS

FIG. 3 is a cross sectional view through another embodiment of the central support member and of the tube located within the support beam.

FIG. 4 shows a cross sectional view of a controlling means for detecting and correcting flexure.

FIG. 5 is an elevational view of the controlling means.

FIG. 8 is a cross sectional view of a terminal bearing of the smoothing device.

DESCRIPTION OF THE PREFERRED EMBODIMENTS

Figure 1:
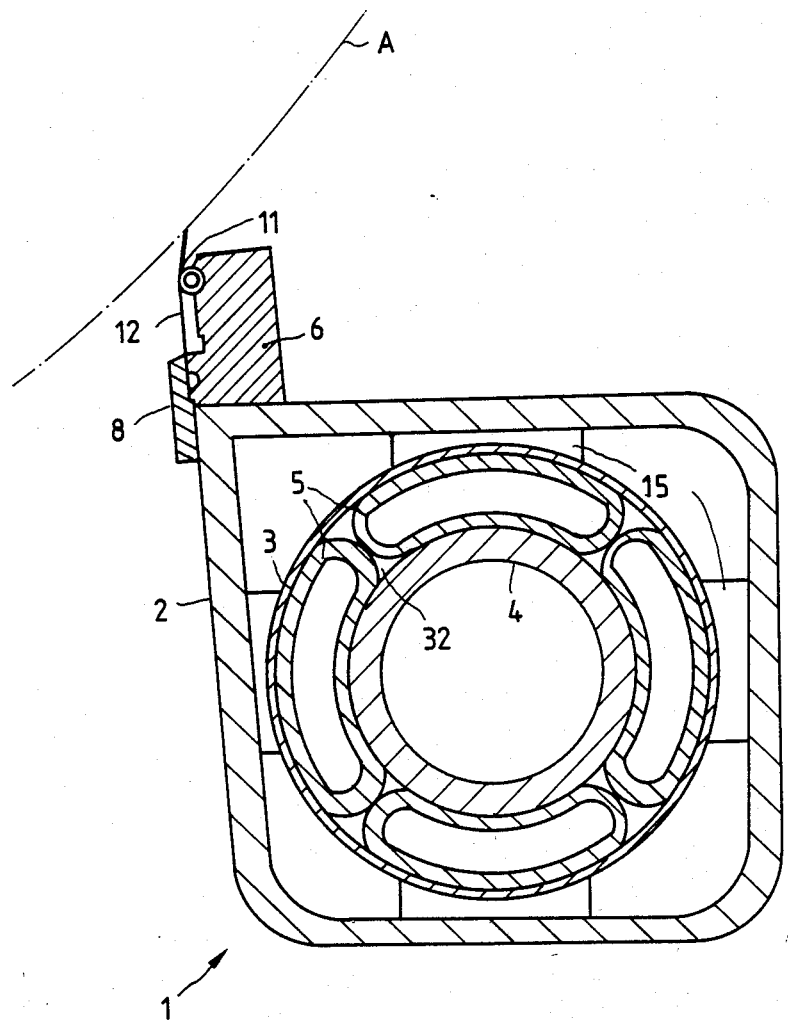
FIG. 1 is a cross sectional view through one embodiment of a support beam and smoothing device according to the invention.

FIG. 1 shows a generally rectangular cross-section support beam 2 for a smoothing device for an applying unit for coating a web. Disposed inside the beam, there is a central support member 4 in the form of a hollow cylinder or tube. The support beam 2 bears on the support member 4 through an external tube 3 located radially between them, and the tube serves as a support element for the beam through the intermediacy of four hydraulically or pneumatically actuated, or more generally, four pressure fluid medium actuated pressure hoses 5. Between the external tube 3 and the support beam 2 there are four pressure hoses 5.

Respective rows of support walls 15 transmit the thrust from the pressure hoses 5 through the intermediate elements to the support beam. The support walls 15 may be attached to the internal tube 3 and may only rest on the internal walls of the support beam 2 in order to make it possible to have sliding relative motion between the support walls 15 and the support beam. In this respect, both the internal walls of the support beam and the sliding surfaces on the support walls 15 may be given a very fine and smooth finish. It is also possible to design the support walls 15 to be continuous in each plane perpendicular to the longitudinal axis of the support beam, so that internally they define a circular recess. On the other hand, the walls 15 may be attached to the support beam 2 and run or rest on the external tube 3. The walls 15 are placed circumferentially to counter the maximum thrust pressure of the hoses 5.

A holding device 6 is located on the support beam 2. It carries the doctor, which is designed in the form of a coating material spreading blade 12. The doctor is carried by a gripping rail 8. The doctor is pressed by a small pressure hose 11 against the web of material, which is marked in broken lines, or against the opposite roll A on which the web is then traveling.

The entire smoothing device 1 is generally mounted in a pivotal manner at its ends, although this is not shown in FIG. 1, so that it is possible to have various different angular settings of the spreading or doctor blade 12 in relation to the tangent to the opposite roll A. The flexion of the support beam 2 may thus take place in different radial planes. Accordingly, the individual pressure hoses 5 would be acted upon by different pressures in a circumferential sequence such that the resulting thrust overrides the line of flexion of the support beam, or so reduces it, or changes it so that there is an even pressing force of the spreading blade 12 on the opposite roll A or on the web of material. In the present case, the flexion of the opposite roll A is also to be taken into account. It is thus possible to act upon the spreading blade 12 via the pressure hose 11 with an even pressure while ensuring compensation, at least in part, via the pressure hoses 5.

Projections 32 are preferably provided in order to establish the positions of the hoses 5.

Figure 2:
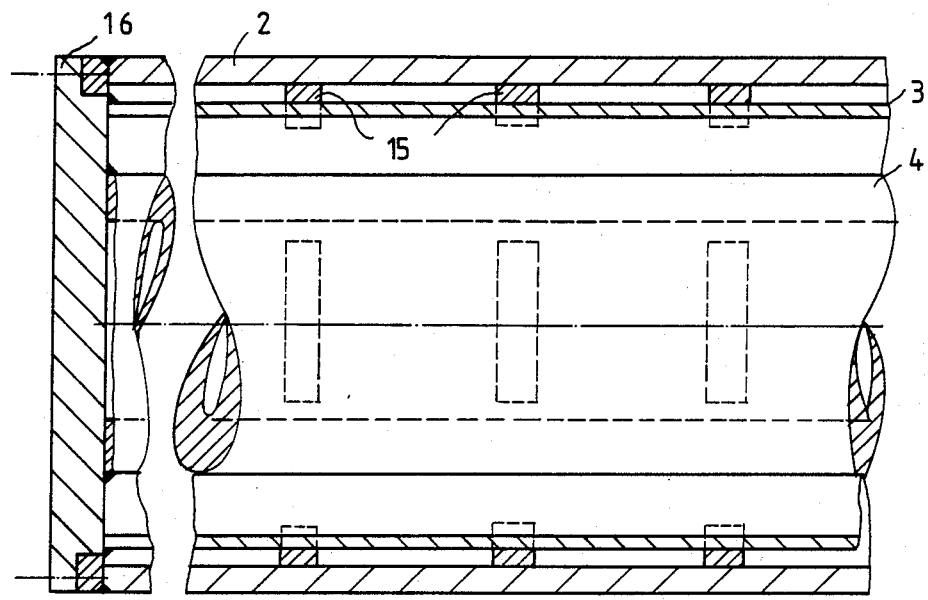
FIG. 2 is a corresponding longitudinal section through that beam.

FIGS. 4 and 5 show in principle a controlling means for the hydraulic or pneumatic pressure medium, i.e., for controlling the level of its pressure. A covering box 29 is secured to the support beam 2, preferably under the beam. On a side wall of the beam, a laser pulse generator 25 is provided which transmits its light pulses towards a receiver 26, which is also secured under the support beam. There are input leads 30 and output electrical leads 31 of the generator and the receiver, respectively. The receiver 26 detects any departures from the linear form of the support beam 2 in both coordinates in directions transverse to the axis of the support beam. Thus, by suitable control of the pressure in the pressure hoses 5, it is possible to correct or compensate for the flexion of the beam. In this respect, the central support member 4, the external tube 3 and the support beam 2 are connected together by means of a rigid holding plate 16 at their ends (FIG. 2).

In the embodiment of FIG. 3, the central support member is in the form of a hollow cylinder 10, which has internal pressure spaces 13 opening at its outer circumference. Like the pressure hoses in FIG. 1, the pressure spaces are distributed symmetrically over the cross section of the support member 10. Respective thrust pistons 14 are slidingly arranged in the pressure spaces. The supply of the driving fluid, which is preferably hydraulic fluid, is via axial ducts 7, transverse lines 9' and holes 9, and furthermore via holes 18 through the thrust pistons. The combined ducts conduct the driving fluid to pressure pockets 17 that are formed in the outer ends of the thrust pistons 14 that are radially outward against the tube. These pressure pockets are respectively sealed off at the sides of each piston. These pistons 14 may be designed with a round cross section or may be in the form of bars and they may be arranged in parallel rows, like the pressure hoses 5 in FIG. 1.

Figure 6:
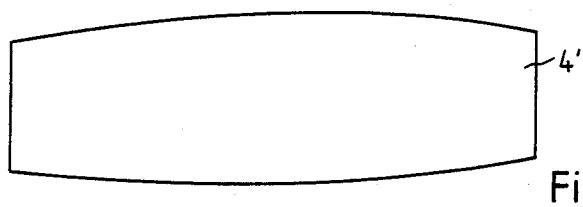
FIG. 6 is a sketch of another design of the support member.

FIG. 6 shows a further variation of the central support member 4'. In this version, the external form of the member is decreased in diameter from its center toward its axial ends in accordance with an e-function, that is, with a crowned form, so that pari passu with the flexure of the member 4', when it is acted upon by pressure by the pressing elements in the form of pressure hoses 5, the engaging surface or effective pressure surface of the member 4' remains substantially constant. On the other hand, it is possible to design the outer form of the member 4' in accordance with the flexure of the opposite roll A so as to provide for corresponding compensation of the flexion of the support beam right from the outset in order that the engaging edge of the doctor element or blade 12 will always engage the opposite roll A with the same pressing thrust along the axial length of the roll A.

Figure 7:
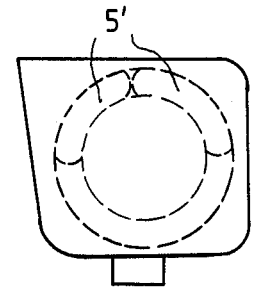
FIG. 7 is a cross-sectional view of yet another working example of the support device.

It is naturally possible to use fewer pressure hoses, for example, as in FIG. 7, and to place them only in the upper part of the intermediate space between the support member 4 and the external tube 3 and to place them at the side opposite the opposite roll A. It is even possible to make do with only one pressure hose in the upper part of this intermediate space. It is then convenient to arrange the supporting device comprising the support member 4, the pressure hose 5' and the external tube 3, so that it may be turned, as shown in principle in FIG. 8, in relation to the support beam. The rotatable parts are then bearinged via the end plate 16' in relation to the support beam 2 by means of ball bearings 17 at both ends of the support beam 2. On twisting or turning the support beam 2 around the central axis of the device, the support member 4, the external tube 3 and the pressure hoses 5 remain in the given position in space so that the flexion of the support beam 2 may be compensated for at every angle thereof.

The central angle between the radial lines drawn through the middle of each pressure hose is naturally then generally substantially less than 180°. In the case of the four hoses or rows of pressing pistons, preferably the respective oppositely placed, paired pressing elements are ganged in pairs for pressure actuation. This makes possible very accurate control of the flexion of the support beam 2, so that this design is to be regarded as the preferred one.

The four hoses pressing element arrangement is preferably also used in the arrangement in FIG. 8. In this case, the central support member 4" is supported by part spherical bearings 36 including an outer ring 38 in an annular member 34, which is attached to a flange 33 of the support member 2 and is preferably screwed thereto, the screw means not being shown. In this case, free flexion of the support member 4" in relation to the support member 2 and the external tube 3' is made possible. In this case, the external tube 3' is firmly connected to the support beam. The support beam 2 must then not be a continuous box girder and it may be welded to the external support tube 3' in sectors so that it is generally attached to angle members with a sector angle of approximately 90°. Relative twist between the support member 4" and the support beam 2 is prevented by a locking pin 40 fitting into a groove 41 in a terminal support pin 37 of the central support member 4". The part spherical bearing is in addition fixedly located on the pin 37 of the support member 4" by a radial spring 39.

FIG. 8 also shows the arrangement of the pressure hoses 5 in dash-dotted or broken lines. The supply of the hydraulic or pneumatic driving fluid is thought of as being to the opposite end and is not shown.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A smoothing device for a unit that applies a coating to a moving web of material, the smoothing device comprising:
   a support beam which extends in its length direction across the web; a doctor for the coating material extending toward the web and extending across the direction of the web; holding means to which the doctor is supported, and the holding means being supported on the support beam and extending along the support beam for supporting the doctor, whereby the force applied to the doctor by the web is transmitted through the holding means to the beam;
   a central support member disposed in the beam and extending axially along the length thereof;
   an external tube around the central support member and radially spaced therefrom; means connecting the support beam to the external tube, whereby the external tube supports the beam;
   at least two rows of pressure medium activated pressing elements which are arranged parallel to the axis of the beam and extending along the beam disposed between the support member and the external tube and being actuatable for supporting the external tube for in turn supporting the beam against undesired flexion;
   wherein the pressing elements comprise a plurality of pressure holes, each adapted to expand upon being pressurized; and
   wherein the pressing hoses are paired, and further comprising means for pressurizing the pressing hoses which pressurizes them in their pairs, wherein each pair comprises a respective pair of opposite pressing hoses.

2. The smoothing device of claim 1, wherein the support beam is hollow.

3. The smoothing device of claim 1, wherein the pressing elements are hydraulically actuatable.

4. The smoothing device of claim 1, wherein the pressing elements are pneumatically actuatable.

5. The smoothing device of claim 1, wherein the support member is in the form of a hollow cylinder.

6. The smoothing device of claim 1, wherein in cross-section the support beam, the support member and the external tube are at least substantially symmetrical both circumferentially and radially.

7. The smoothing device of claim 1, wherein the pressing pistons have radially outer ends with lateral edges and the pressing pistons are shaped to define sealing pressure pockets at the lateral edges at the radially outer ends, and means communicating with a pressure supply which supply pressure medium to the pressure pockets.

8. The smoothing device of claim 1, further comprising antifriction bearings for supporting the support member, the external tube and the pressing elements in relation to the support beam.

9. The smoothing device of claim 1, further comprising a part spherical bearing at the end of the support member via an annular member on the support beam, and the annular member extending annularly around the bearing for being supported on the bearing.

10. The smoothing device of claim 1, wherein the external tube has the cross-section of a circular ring.

11. The smoothing device of claim 1, wherein the central support member is a radially symmetrical structure.

12. The smoothing device of claim 11, wherein the support member has an external shape which has its widest cross-section toward the axial center and which gradually tapers narrower in cross-section toward its ends generally and with bilateral symmetry, whereby the support member has a generally crowned form.

13. The smoothing device of claim 1, wherein the pressing elements comprise four parallel rows, each row comprised of a respective plurality of pressing pistons and each having a piston surface generally conforming to the cross-section of the support beam for engaging the support beam.

14. The smoothing device of claim 13, wherein the pressing pistons are further comprising paired, and means for pressurizing the pressing pistons in their pairs, wherein each pair comprises a respective pair of opposite pressing pistons.

15. The smoothing device of claim 13, wherein the rows of pressing piston are in a substantially symmetrical arrangement around the support member.

16. The smoothing device of claim 13, wherein the pressing pistons have radially outer ends with lateral edges and the pressing pistons are shaped to define sealing pressure pockets at the lateral edges at the radially outer ends, and means communicating with a pressure supply which supply pressure medium to the pressure pockets.

17. The smoothing device of claim 1, wherein the support beam is supported to bear upon the external tube, and support walls are disposed between the support beam and the external tube.

18. The smoothing device of claim 17, wherein the support walls are so disposed between the support beam and the external tube in a manner that the external tube may shift axially with respect to the support beam and the support walls permit such shifting.

19. The smoothing device of claim 18, wherein the support walls are attached to one of the support beam and the external tube and freely slide over the other as the support beam and external tube shift axially with respect to one another.

20. The smoothing device of claim 18, wherein the support walls are disposed generally radially outward of each of the pressing elements, respectively.

* * * * *